United States Patent
Castelino et al.

(10) Patent No.: US 9,323,564 B2
(45) Date of Patent: Apr. 26, 2016

(54) SYSTEMS, METHODS AND COMPUTER PROGRAM PRODUCTS FOR BOOTSTRAPPING A TYPE 1 VIRTUAL MACHINE MONITOR AFTER OPERATING SYSTEM LAUNCH

(75) Inventors: Manohar R. Castelino, Santa Clara, CA (US); Vedvyas Shanbhogue, Austin, TX (US); Sergio Rodriguez, San Lorenzo, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 13/995,245

(22) PCT Filed: Dec. 28, 2011

(86) PCT No.: PCT/US2011/067582
§ 371 (c)(1),
(2), (4) Date: Apr. 18, 2014

(87) PCT Pub. No.: WO2013/100962
PCT Pub. Date: Jul. 4, 2013

(65) Prior Publication Data
US 2014/0223429 A1    Aug. 7, 2014

(51) Int. Cl.
*G06F 9/455* (2006.01)
*G06F 9/44* (2006.01)

(52) U.S. Cl.
CPC .......... *G06F 9/45558* (2013.01); *G06F 9/4401* (2013.01)

(58) Field of Classification Search
CPC ........................... G06F 9/45558; G06F 9/4401
USPC .......................................................... 718/1
See application file for complete search history.

(56) References Cited

U.S. PATENT DOCUMENTS

| 7,865,762 | B2 | 1/2011 | Swanson | |
| 2005/0044301 | A1* | 2/2005 | Vasilevsky | G06F 9/45533 711/1 |
| 2008/0263658 | A1* | 10/2008 | Michael | G06F 21/562 726/22 |
| 2009/0133097 | A1 | 5/2009 | Smith et al. | |
| 2011/0161955 | A1* | 6/2011 | Woller | G06F 9/4406 718/1 |
| 2011/0251992 | A1 | 10/2011 | Bethlehem et al. | |

FOREIGN PATENT DOCUMENTS

WO    2013/100962 A1    7/2013

OTHER PUBLICATIONS

International Search Report and Written Opinion received for PCT Patent Application No. PCT/US2011/067582, mailed on Sep. 27, 2012, 8 pages.
International Preliminary Report on Patentability and Written Opinion received for PCT Patent Application No. PCT/US2011/067582, mailed on Jul. 10, 2014, 5 pages.
Extended European Search report received for European Patent Application No. 11879115.1, mailed on Jul. 7, 2015, 4 pages.

* cited by examiner

*Primary Examiner* — Camquy Truong
(74) *Attorney, Agent, or Firm* — Garrett IP, LLC (57) ABSTRACT

Systems, methods, and computer program products that provide for the use of a type 2 VMM to de-link or isolate underlying processor hardware from an operating system. This may allow the launching of a task that requires direct access to processor hardware, where such access requires the absence of an operating system. Such a task may take the form of a type 1 VMM, such as an information security or integrity VMM, e.g., an anti-malware VMM.

18 Claims, 6 Drawing Sheets

SYSTEMS, METHODS AND COMPUTER PROGRAM PRODUCTS FOR BOOTSTRAPPING A TYPE 1 VIRTUAL MACHINE MONITOR AFTER OPERATING SYSTEM LAUNCH

BACKGROUND

A virtual machine monitor (VMM), also known as a hypervisor, is a mechanism for virtualizing hardware computing resources, allowing multiple operating systems (known as guests) to run concurrently on a host processor. A VMM may present to the guest operating systems a virtual operating platform and may manage the execution of the guest operating systems.

There are two forms of VMMs. A type 1 VMM may run directly on processor hardware, controlling the hardware to manage guest operating systems. In this case, a guest operating system may therefore run on a level above the VMM. A type 2 VMM may run within a conventional operating system environment. Such a VMM may therefore operate at a second software level, above the hardware and above the operating system. A guest operating system may therefore run at a third level in this setting.

Currently, a type 1 VMM may be launched in one of three ways. First, such a VMM may be launched prior to booting the operating system, using a custom boot strap process. Second, a type 1 VMM may be launched early in the boot phase by the operating system itself. This may involve direct access to operating system's core data structures, which in turn may require a variety of security permissions. This approach may require an operating system that is specially designed to support the launch of a type 1 VMM. Third, a type 1 VMM may be launched by first modifying one or more core operating system data structures without knowledge of the operating system. This represents an unconventional approach not envisioned by operating system designers. Moreover, this approach may result in significant instability. A computer system in such a situation may be susceptible to failure, particularly in the event of operating system changes or updates.

As a result, there is currently no solution that safely allows the launch of a type 1 VMM after an operating system has been enabled.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that, this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The systems, methods, and computer program products described herein provide for the use of a type 2 VMM to de-link or isolate underlying processor hardware from an operating system. This may allow the launching of a task that requires direct access to processor hardware, where such access requires the absence of an operating system. Such a task may take the form of a type 1 VMM, such as an information security or integrity VMM, e.g., an anti-maiware VMM. In alternative embodiments, a type 1 VMM of another type may be used.

Figure 1:
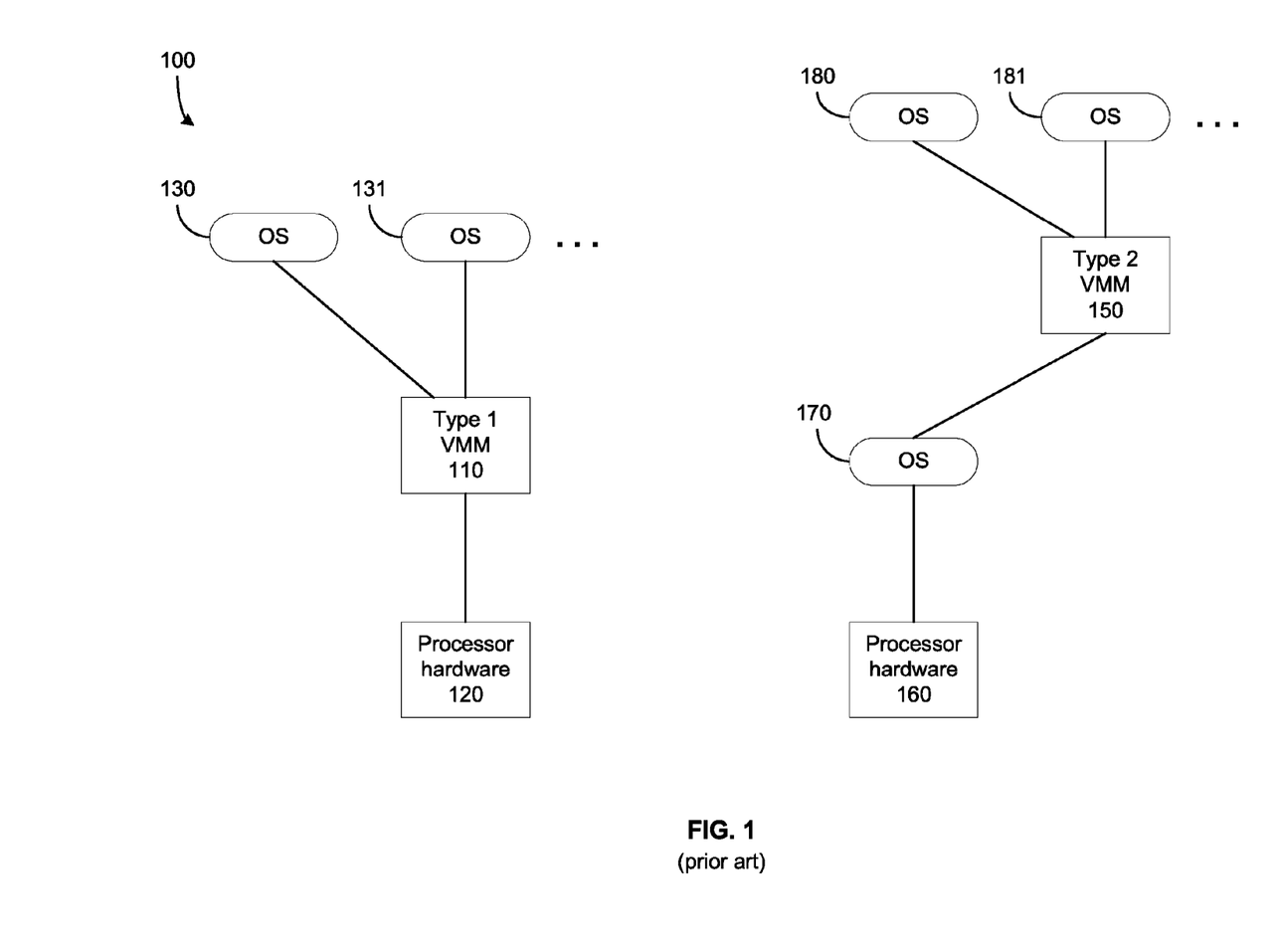
FIG. 1 is a block diagram illustrating type 1 and 2 VMMs.

Generally, a type 1 VMM may operate directly on processor hardware, without an intervening operating system. This is illustrated in FIG. 1. Here, a type 1 VMM 110 is shown operating on processor hardware 120. The VMM 110 may allow virtualization of hardware resources for each of several guest operating systems 130, 131, etc. In contrast, a type 2 VMM 150 may virtualize resources of hardware 160, but operates within the context of an operating system 170. A typical type 2 VMM may allow virtual access to hardware 160 by each of several guest operating systems 180, 181, etc.

Figure 2:
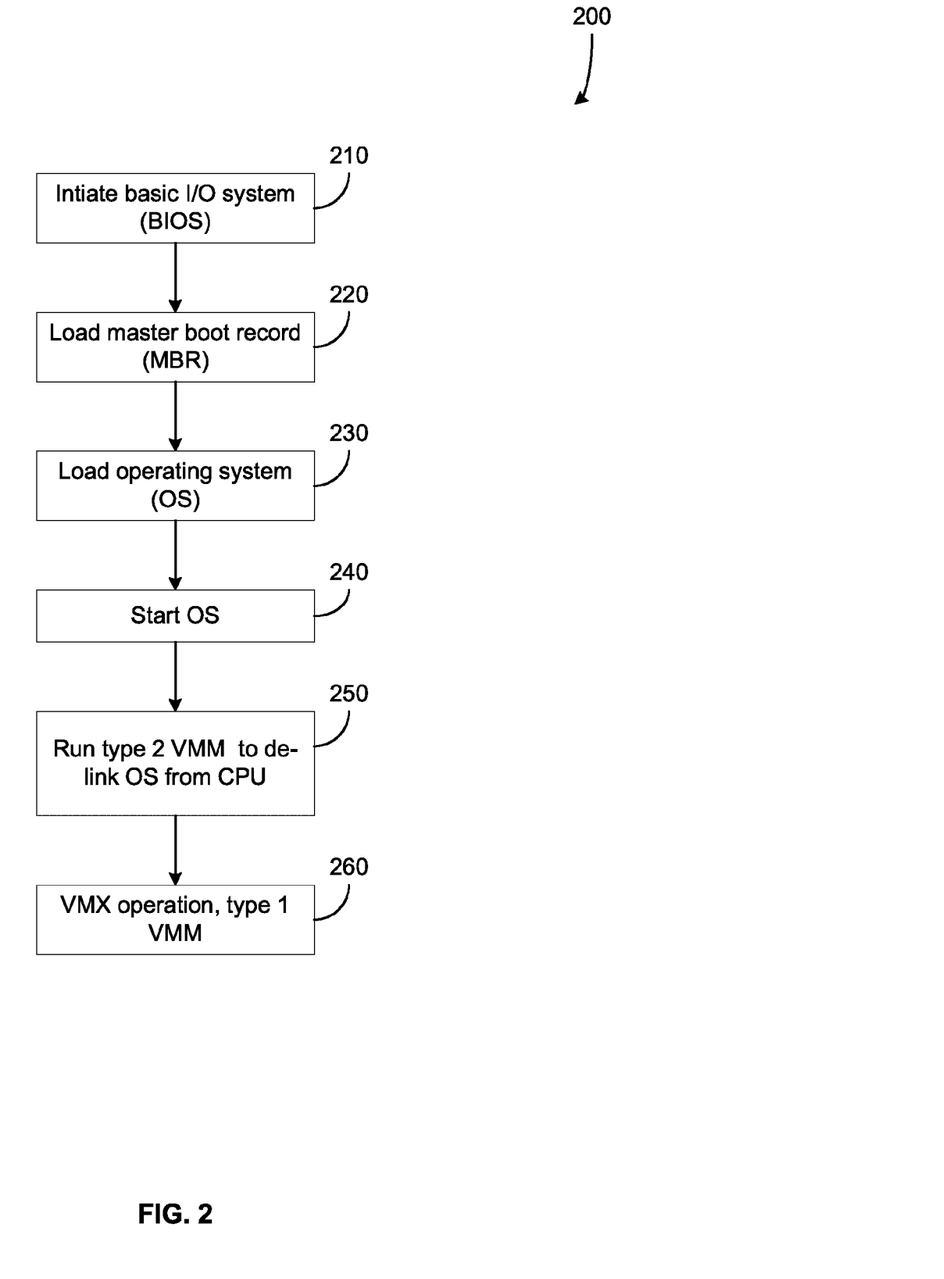
FIG. 2 is a flowchart illustrating the processing described herein, according to an embodiment.

The overall processing of the system described herein is illustrated in FIG. 2, according to an embodiment. At 210, a basic I/O system (BIOS) may be initiated. At 220 a master boot record may be loaded in advance of a subsequent boot-up. At 230, the operating system may be loaded. At 240, the operating system may be started. A 250, a type 2 VMM may be run, where this VMM de-links the operating system from the underlying processor, i.e., central processing unit (CPU) hardware, effectively freezing the operating system and isolating the processor from the operating system. At 260, a task that requires direct access to the processor may be launched, where this access requires that the operating system not be active. An example of such a task may be a type 1 VMM, such as an anti-malware VMM. Alternatively, such a task may be a scan for system failures, or a deep probing process of computing hardware.

Figure 3:
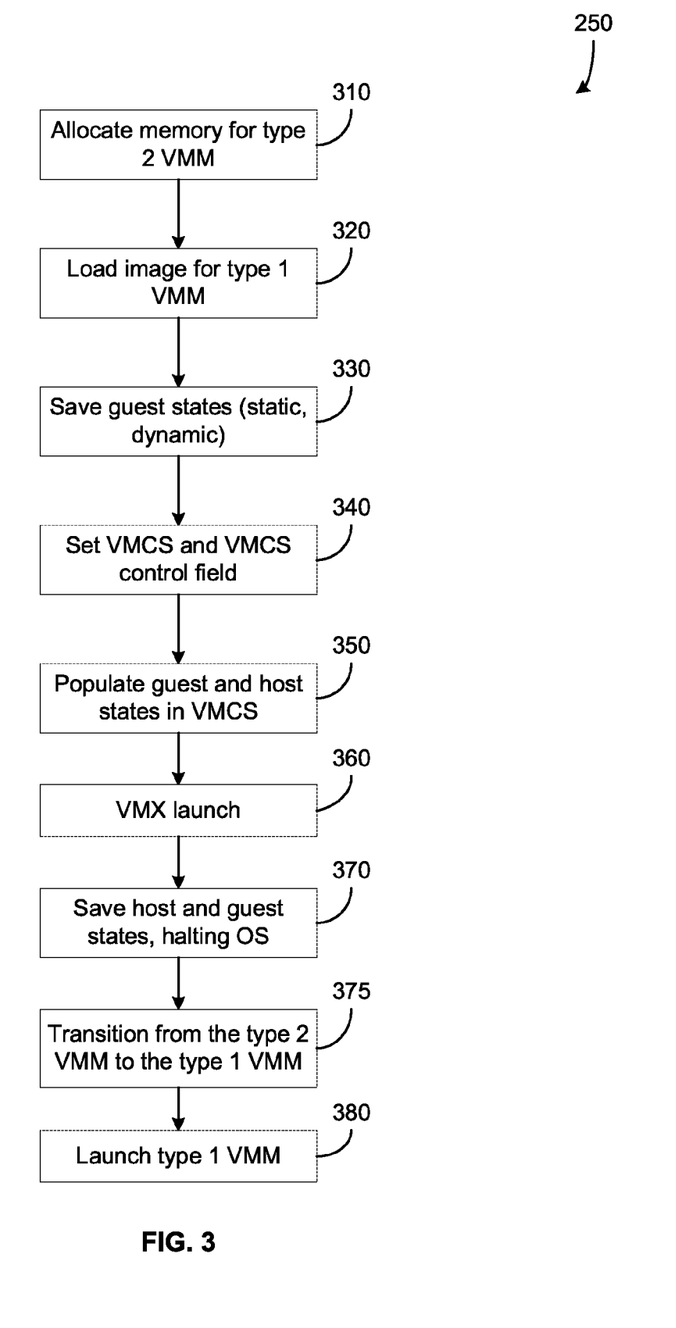
FIG. 3 is a flowchart illustrating the operation of a type 2 VMM, according to an embodiment.

The running of the above type 2 VMM (250 in FIG. 2) is illustrated in greater detail in FIG. 3, according to an embodiment. At 310, memory may be allocated for this type 2 VMM. At 320, the image for the type 1 VMM may be loaded, where this latter VMM may be launched at a subsequent point, as will be described below. As discussed above, an image for a different task (other than a type 1 VMM) requiring direct access to the processor may be loaded instead. At 330, both static and dynamic guest operating system states may be saved. At 340, a virtual machine control structure (VMCS) may be set, along with a VMCS control field. At 350, the guest and host OS states in the VMCS may be populated. At 360, the type 2 VMM may be launched, shown here as a virtualization extension launch, or VMX. At 370, the host and guest states may be saved and the operating system effectively halted. Note that in a multi-processor environment, the OS states may be saved and halted for all processors.

At 375, a transition from the type 2 VMM to the type 1 VMM may be performed, in a manner to be described in greater detail below. At 380, the type 1 VMM (or other task requiring direct access to the processor hardware) may be launched. At this point, the processor may look as if a boot had just taken place, and the processor may be put into any state desired by the type 1 VMM.

Figure 4:
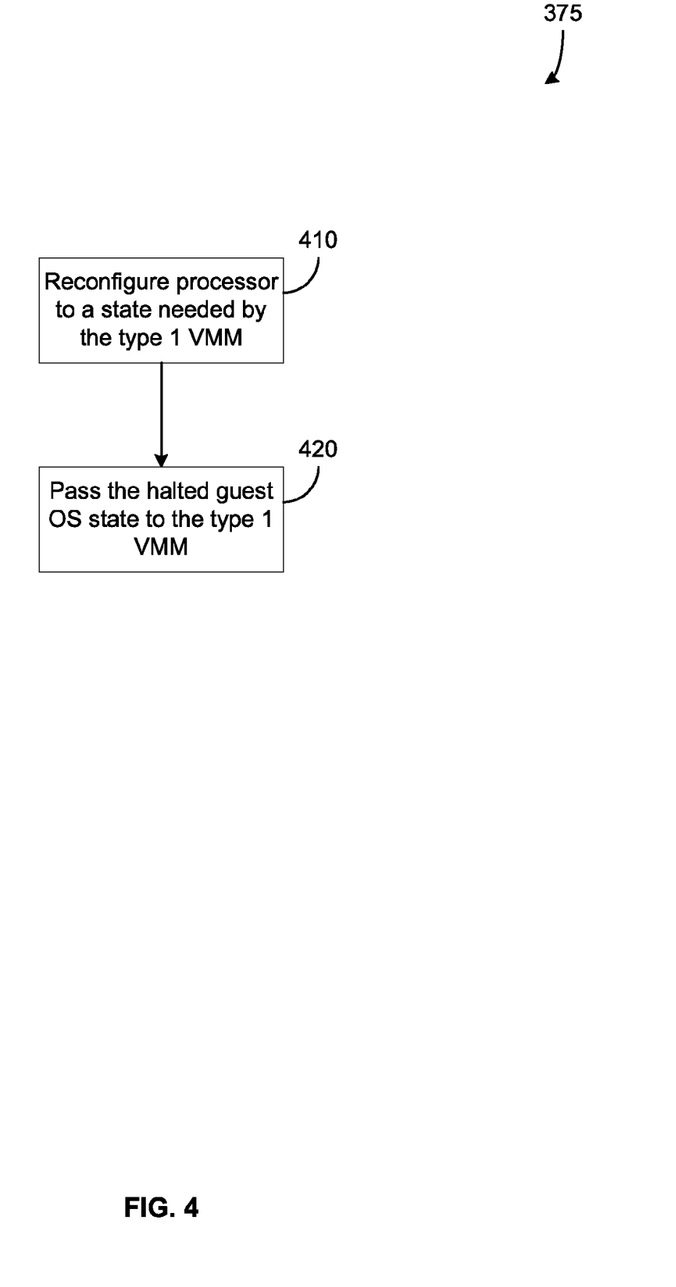
FIG. 4 is a flowchart illustrating the transition from a type 2 VMM to a type 1 VMM, according to alternative embodiment.

A process for transitioning from the type 2 VMM to the type 1 VMM (375 in FIG. 3' is illustrated in FIG. 4, according to an embodiment. At 410, the processor may be reconfigured to a state needed by the type 1 VMM. At 420, the halted guest operating system state may be passed to the type 1 VMM, which may then be launched as shown at 380 of FIG. 3.

Figure 5:
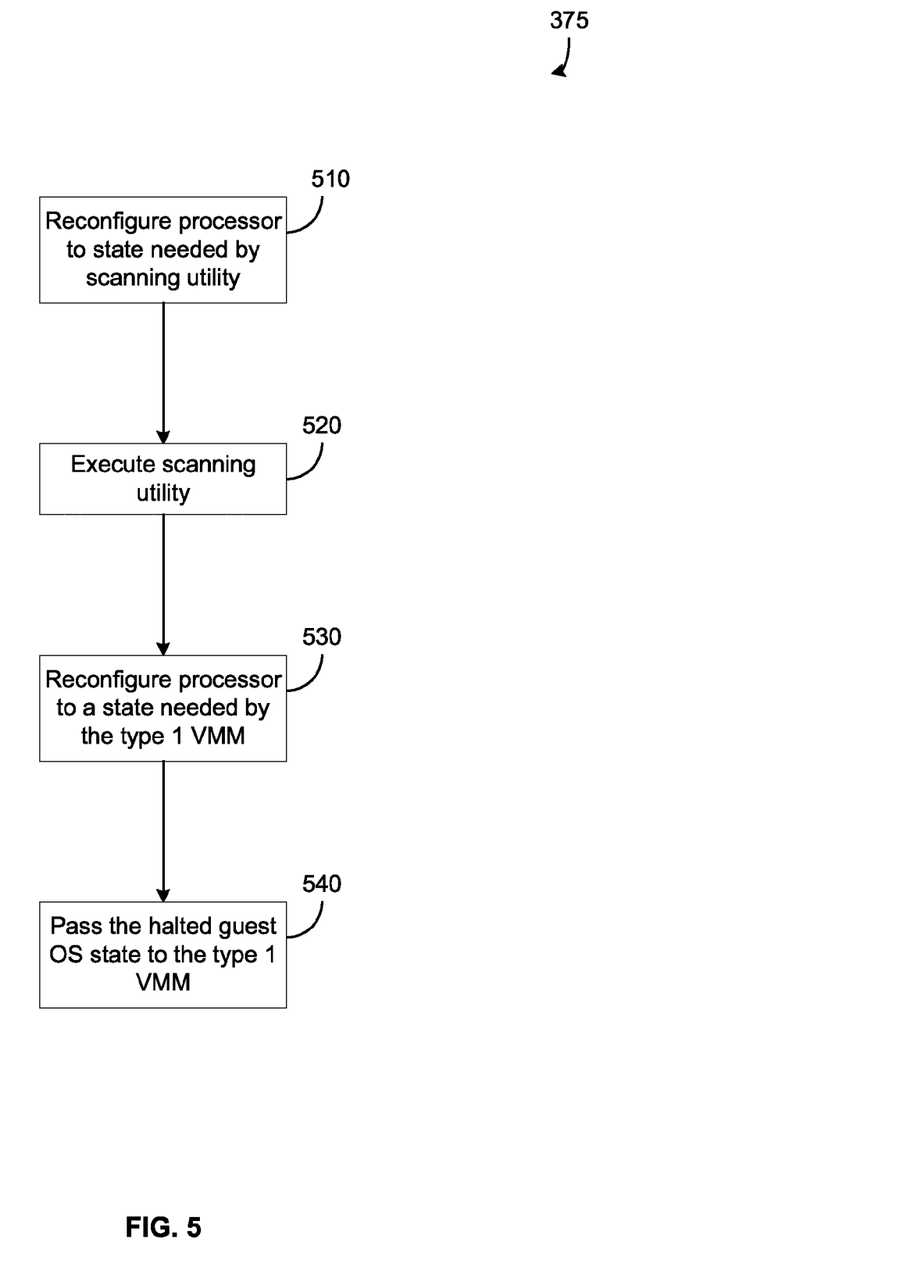
FIG. 5 is a flowchart illustrating the transition from a type 2 VMM to a type 1 VMM, according to an alternative embodiment.

In an alternative embodiment, shown in FIG. 5, a scanning utility may be employed to perform system checks prior to the launch of the type 1 VMM. In an embodiment, these system checks may be security-related, and may detect compromises to system security. Alternatively or in addition, these checks may detect failure conditions. At 510, the processor may be reconfigured to a state required by such a scanning utility. At 520, this scanning utility may be executed. At 530, the processor may be reconfigured to a state needed by the type 1 VMM. At 540, the halted guest operating system state may be passed to the type 1 VMM, which may then be launched as shown at 380 of FIG. 3.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, ROM, RAM, or other data storage device.

In an embodiment, some or all of the processing described herein may be implemented as software or firmware. Such a software or firmware embodiment is illustrated in the context of a computing system 600 in FIG. 6. System 600 may include a central processing unit (CPU) 620 and a body of memory 610 that may include one or more non-transitory computer readable media that may store computer program logic 640. Memory 610 may be implemented as a read-only memory (ROM) or random access memory (RAM) device, for example. CPU 620 and memory 610 may be in communication using any of several technologies known to one of ordinary skill in the art, such as a bus or a point-to-point interconnect. Computer program logic 640 contained in memory 610 may be read and executed by CPU 620. In an embodiment. One or more I/O ports and/or I/O devices, shown collectively as I/O 630, may also be connected to CPU 620 and memory 610.

Figure 6:
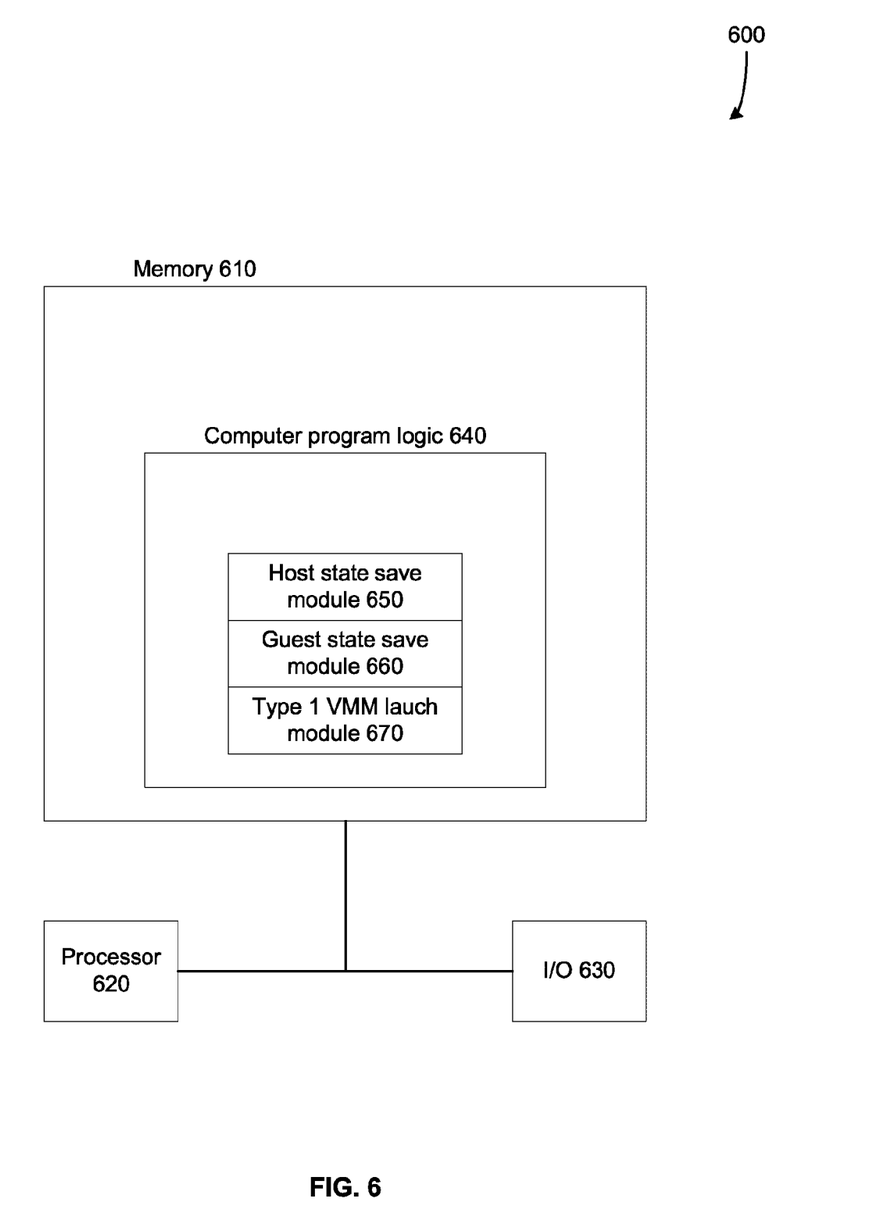
FIG. 6 is a block diagram illustrating the computing environment of a software or firmware embodiment of the system described herein.

In the embodiment of FIG. 6, computer program logic 640 may include a module 650 responsible for saving a host state. Computer program logic 640 may also include a module 660 responsible for saving a guest state. Modules 650 and 660 may allow for the halting of an operating system while retaining current states of the operating system and processor 620. In addition, computer program logic 640 may include a module 670 responsible for launch of a type 1 VMM (or other task requiring direct access to processor 620 without an operating system).

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
    executing an operating system (OS) on one or more processors of a computer system;
    executing a type 2 virtual machine monitor (VMM) on the one or more processors from the OS to isolate the OS from the one or more processors,
    wherein the executing a type 2 VMM includes,
        saving a current state of the one or more processors as a first state,
        halting execution of the OS on the one or more processors, and
        reconfiguring the one or more processors to a second state in which to permit a type 1 VMM to access physical resources of the computer, while execution of the OS is halted and subsequent to saving the first state,
        and passing the saved first state to the type 1 VMM while execution of the OS is halted; and
    launching the type 1 VMM on the one or more processors from the type 2 VMM while execution of the OS is halted and subsequent to reconfiguring the one or more processors to the second state, to access the physical resources of the computer system while execution of the OS is halted.

2. The method of claim 1, further including:
    reconfiguring the one or more processors to a third state, while execution of the OS is halted, subsequent to the saving the first state, and prior to reconfiguring the one or more processors to the second state, to permit a scanning utility to access the physical resources of the computer system; and
    executing the scanning utility on the one or more processors while execution of the OS is halted and subsequent to reconfiguring the one or more processors to the third state, to detect one or more of a system failure and a system compromise.

3. The method of claim 1, wherein the launching a type 1 VMM includes launching an anti-malware VMM on the one or more processors while execution of the OS is halted.

4. The method of claim 1, further including launching a scanning utility on the one or more processors while execution of the OS is halted and subsequent to reconfiguring the one or more processors to the second state, to scan physical resources of the computer system while execution of the OS is halted.

5. The method of claim 1, wherein the task further including launching a probing utility on the one or more processors while execution of the OS is halted and subsequent to reconfiguring the one or more processors to the second state, to probe a process of the physical resources of the computer system while execution of the OS is halted.

6. The method of claim 1, further including, prior to the executing a type 2 VMM:
   allocating memory for the type 2 VMM;
   setting a current virtual machine control structure (VMCS);
   setting a control field for the VMCS; and
   populating guest and host states in the VMCS.

7. A non-transitory computer readable medium encoded with a computer program that includes instructions to cause one or more processors of a computer system to:
   execute an operating system (OS) on the one or more processors;
   execute a type 2 virtual machine monitor (VMM) on the one or more processors from the OS to isolates the OS from the one or more processors, including to,
      save a current state of the one or more processors as a first state,
      halt execution of the OS on the one or more processors, and
      reconfigure the one or more processors to a second state in which to permit a type 1 VMM to access physical resources of the computer, while execution of the OS is halted and subsequent to saving the first state, and
      pass the saved first state to the type 1 VMM while execution of the OS is halted; and
   launch the type 1 VMM on the one or more processors from within the type 2 VMM while execution of the OS is halted and subsequent to reconfiguring the one or more processors to the second state, to access the physical resources of the computer system while execution of the OS is halted.

8. The computer program product of claim 7, further including instructions to cause the one or more processors to:
   reconfigure the one or more processors to a third state, while execution of the OS is halted, subsequent to the saving the first state, and prior to reconfiguring the one or more processors to the second state, to permit a scanning utility to access the physical resources of the computer system; and
   execute the scanning utility on the one or more processors while execution of the OS is halted and subsequent to reconfiguring the one or more processors to the third state, to detect one or more of a system failure and a system compromise.

9. The computer program product of claim 7, wherein the type 1 VMM includes an anti-malware VMM.

10. The computer program product of claim 7, further including instructions to cause the one or more processors to:
   launch a scanning utility on the one or more processors while execution of the OS is halted and subsequent to reconfiguring the one or more processors to the second state, to scan physical resources of the computer system while execution of the OS is halted.

11. The computer program product of claim 7, further including instructions to cause the one or more processors to:
   launch a probing utility on the one or more processors while execution of the OS is halted and subsequent to reconfiguring the one or more processors to the second state, to cause the one or more processors to probe a process of the physical resources of the computer system while execution of the OS is halted.

12. The computer program product of claim 7, further including instructions to cause the one or more processors to:
   allocate memory for the type 2 VMM prior to launching the type 2 VMM;
   set a current virtual machine control structure (VMCS) prior to launching the type 2 VMM;
   set a control field for the VMCS prior to launching the type 2 VMM; and
   populate guest and host states in the VMCS prior to launching the type 2 VMM.

13. A system, comprising one or more processors and memory configured to:
   execute an operating system (OS) on the one or more processors;
   execute a type 2 virtual machine monitor (VMM) on the one or more processors from the OS to isolates the OS from the one or more processors, including to,
      save a current state of the one or more processors as a first state,
      halt execution of the OS on the one or more processors, and
      reconfigure the one or more processors to a second state in which to permit a type 1 VMM to access physical resources of the computer, while execution of the OS is halted and subsequent to saving the first state, and
      pass the saved first state to the type 1 VMM while execution of the OS is halted; and
   launch the type 1 VMM on the one or more processors from within the type 2 VMM while execution of the OS is halted and subsequent to reconfiguring the one or more processors to the second state, to access the physical resources of the computer system while execution of the OS is halted.

14. The system of claim 12, wherein the one or more processors and memory are further configured to direct said processor to run the type 2 VMM further comprises instructions configured to:
   reconfigure the one or more processors to a third state, while execution of the OS is halted, subsequent to the saving the first state, and prior to reconfiguring the one or more processors to the second state, to permit a scanning utility to access the physical resources of the computer system; and
   execute the scanning utility on the one or more processors while execution of the OS is halted and subsequent to reconfiguring the one or more processors to the third state, to detect one or more of a system failure and a system compromise.

15. The system of claim 13, wherein the type 1 VMM includes an anti-malware VMM.

16. The system of claim 13, wherein the one or more processors and memory are further configured to:
   launch a scanning utility on the one or more processors while execution of the OS is halted and subsequent to reconfiguring the one or more processors to the second state, to scan physical resources of the computer system while execution of the OS is halted.

17. The system of claim 13, wherein the one or more processors and memory are further configured to:
   launch a probing utility on the one or more processors while execution of the OS is halted and subsequent to reconfiguring the one or more processors to the second state, to cause the one or more processors to probe a process of the physical resources of the computer system while execution of the OS is halted.

18. The system of claim 13, wherein the one or more processors and memory are further configured to:
   allocate memory for the type 2 VMM prior to launching the type 2 VMM;
   set a current virtual machine control structure (VMCS) prior to launching the type 2 VMM;

set a control field for the VMCS prior to launching the type 2 VMM; and populate guest and host states in the VMCS prior to launching the type 2 VMM.

* * * * *